United States Patent
Roof et al.

(10) Patent No.: US 10,275,812 B2
(45) Date of Patent: Apr. 30, 2019

(54) METHOD AND APPARATUS FOR DENYING A TRANSACTION DETECTED TO BE INITIATED OUTSIDE OF A REQUIRED APPLICATION ON AN ENDPOINT DEVICE

(71) Applicant: Xerox Corporation, Norwalk, CT (US)

(72) Inventors: Bryan J. Roof, Newark, NY (US); Andrew Shih-Suen Yeh, Portland, OR (US); Howard A. Mizes, Pittsford, NY (US); Haitao Du, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 694 days.

(21) Appl. No.: 14/331,450

(22) Filed: Jul. 15, 2014

(65) Prior Publication Data

US 2016/0019613 A1   Jan. 21, 2016

(51) Int. Cl.
| | |
|---|---|
| *G06Q 30/00* | (2012.01) |
| *G06Q 30/06* | (2012.01) |
| *G06Q 40/00* | (2012.01) |
| *G06F 16/2457* | (2019.01) |

(52) U.S. Cl.
CPC ... *G06Q 30/0609* (2013.01); *G06F 16/24578* (2019.01); *G06Q 30/0635* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 6,070,141 A  * | 5/2000 | Houvener | ........... | G06Q 20/04 235/380 |
| 9,953,321 B2 * | 4/2018 | Zoldi | ........... | G06Q 20/4016 |
| 2007/0112824 A1 * | 5/2007 | Lock | ........... | G06N 5/025 |
| 2010/0043055 A1 * | 2/2010 | Baumgart | ........... | G06Q 20/12 726/2 |
| 2011/0225076 A1 * | 9/2011 | Wang | ........... | G06Q 20/12 705/35 |
| 2012/0130853 A1 * | 5/2012 | Petri | ........... | G06O 30/0609 705/26.35 |
| 2013/0024364 A1 * | 1/2013 | Shrivastava | ........... | G06Q 20/38 705/39 |
| 2014/0316960 A1 * | 10/2014 | Katepally | ........... | G06Q 40/02 705/35 |
| 2015/0339670 A1 * | 11/2015 | Shaked | ........... | H04L 9/3228 705/44 |
| 2016/0267541 A1 * | 9/2016 | Breakey | ........... | G06Q 30/02 |

OTHER PUBLICATIONS

H. Li and M. Singhal, "Trust Management in Distributed Systems," in Computer, vol. 40, No. 2, pp. 45-53, Feb. 2007. doi: 10.1109/MC.2007.76 (Year: 2007).*

* cited by examiner

*Primary Examiner* — Michael Misiaszek
*Assistant Examiner* — Michelle T Kringen (57) ABSTRACT

A method, non-transitory computer readable medium, and apparatus for calculating a transaction quality score of a merchant are disclosed. For example, the method analyzes fraudulent transaction data in a fraudulent transaction data table for each one of a plurality of merchants, calculates a transaction quality score for the each one of the plurality of merchants based on the fraudulent transaction data, filters the plurality of merchants having a respective transaction quality score above a threshold and transmits the plurality of merchants having the respective transaction quality score above the threshold for display.

19 Claims, 3 Drawing Sheets

METHOD AND APPARATUS FOR DENYING A TRANSACTION DETECTED TO BE INITIATED OUTSIDE OF A REQUIRED APPLICATION ON AN ENDPOINT DEVICE

The present disclosure relates generally to protecting consumers and reducing fraudulent activity and, more particularly, to a method and apparatus for calculating a transaction quality score of a merchant.

BACKGROUND

Currently, there are no methods for objectively scoring or rating a trustworthiness of a merchant. It has been observed that fraudulent activity for transactions is not distributed evenly among merchants. Thousands of dollars are wasted each year to resolve fraudulent transactions with merchants. Methods exist for rating a trustworthiness of a consumer to inform a merchant whether the merchant should proceed with a transaction, but such rating in the reverse direction does not exist.

Some methods allow customers to rate the merchant. However, these methods are subjective and based on each customer's unique experience with a particular merchant. For example, one bad review by a customer based on an isolated incident may skew the overall ratings for the merchant. In other words, the customer reviews may be biased or the review may be based on an unverified transaction between the customer and the merchant. Thus, ratings of a merchant based on customer reviews may not be accurate and objective.

SUMMARY

According to aspects illustrated herein, there are provided a method, a non-transitory computer readable medium, and an apparatus for calculating a transaction quality score of a merchant. One disclosed feature of the embodiments is a method that analyzes fraudulent transaction data in a fraudulent transaction data table for each one of a plurality of merchants, calculates a transaction quality score for the each one of the plurality of merchants based on the fraudulent transaction data, filters the plurality of merchants having a respective transaction quality score above a threshold and transmits the plurality of merchants having the respective transaction quality score above the threshold for display.

Another disclosed feature of the embodiments is a non-transitory computer-readable medium having stored thereon a plurality of instructions, the plurality of instructions including instructions which, when executed by a processor, cause the processor to perform an operation that analyzes fraudulent transaction data in a fraudulent transaction data table for each one of a plurality of merchants, calculates a transaction quality score for the each one of the plurality of merchants based on the fraudulent transaction data, filters the plurality of merchants having a respective transaction quality score above a threshold and transmits the plurality of merchants having the respective transaction quality score above the threshold for display.

Another disclosed feature of the embodiments is an apparatus comprising a processor and a computer readable medium storing a plurality of instructions which, when executed by the processor, cause the processor to perform an operation that analyzes fraudulent transaction data in a fraudulent transaction data table for each one of a plurality of merchants, calculates a transaction quality score for the each one of the plurality of merchants based on the fraudulent transaction data, filters the plurality of merchants having a respective transaction quality score above a threshold and transmits the plurality of merchants having the respective transaction quality score above the threshold for display.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for calculating a transaction quality score of a merchant. As discussed above, currently available methods only allow merchants to rate customers to determine whether the merchant desires to complete a transaction with the customer or subjective ratings by customers of a particular merchant. There is currently no available technology for providing objective scores of a merchant to allow a customer decide whether the customer can trust a merchant to complete a fraudulent free transaction.

One embodiment of the present disclosure calculates a transaction quality score for each one of a plurality of merchants based upon fraudulent transaction data. In one embodiment, the transaction quality score may be displayed to a consumer to allow the consumer to decide which merchant the consumer wants to engage in a transaction.

In one embodiment, the transaction quality score may be provided via an application on an endpoint device of the consumer. The consumer may filter the merchants based on the transaction quality score. The transaction quality score may be used to also warn consumers of high risk transaction that could shift the burden of costs associated with fraud to the consumer if the consumer proceeds with a transaction with a merchant that has a low transaction quality score.

Figure 1:
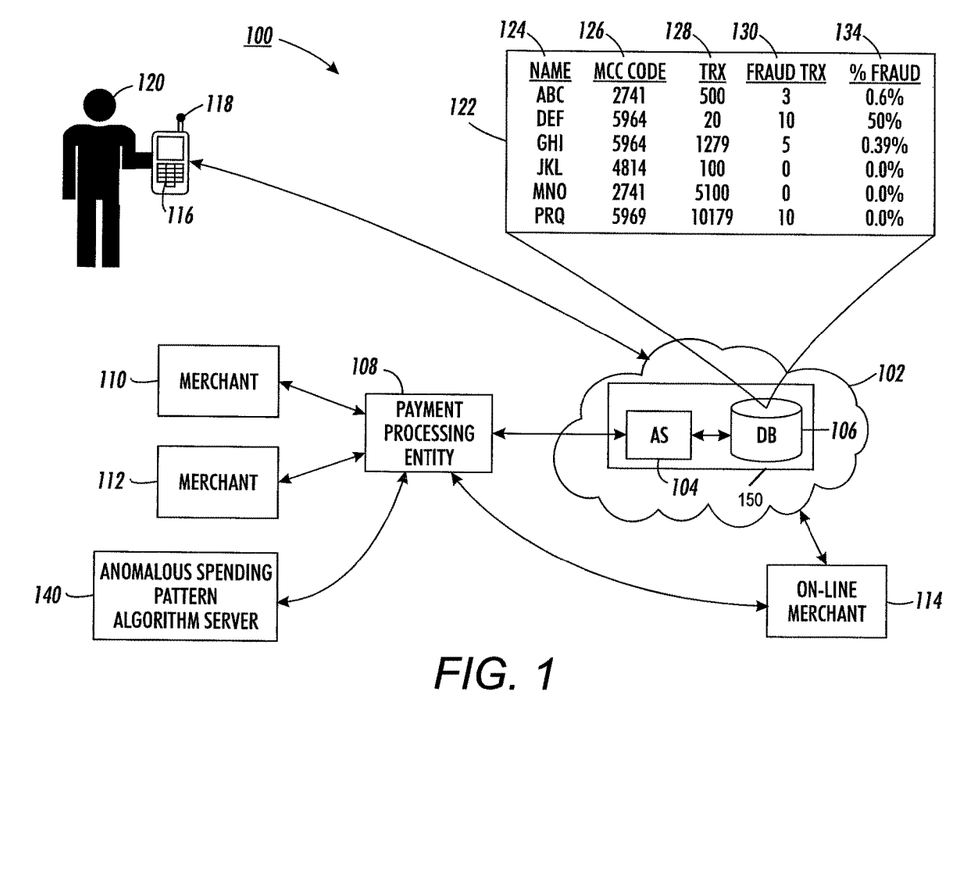
FIG. 1 illustrates an example block diagram of a system of the present disclosure.

FIG. 1 illustrates an example system 100 of the present disclosure. In one embodiment, the system 100 may include an Internet protocol (IP) network 102 having an application server (AS) 104 and a database (DB) 106. The IP network 102 may be any type of IP network including for example, a broadband access network, a cable access network, a cellular communications network, and the like. The IP network 102 in FIG. 1 has been simplified and may include other network elements not shown, such as for example, border elements, routers, switches, gateways, firewalls, and the like.

Figure 3:
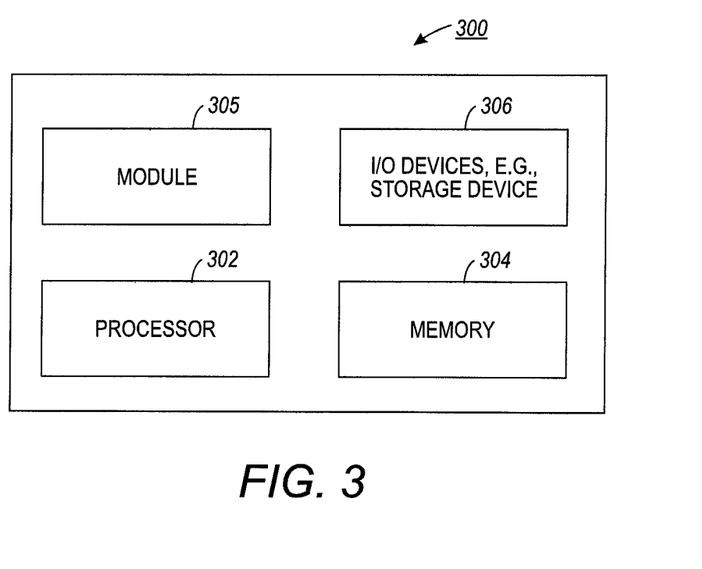
FIG. 3 illustrates a high-level block diagram of a general-purpose computer suitable for use in performing the functions described herein.

In one embodiment, the AS 104 may be deployed as a hardware processor or a general purpose computer as illustrated in FIG. 3 and discussed below. The AS 104 may be configured or programmed to perform the operations and functions described herein. In one embodiment, the DB 106 may be a computer readable storage medium that stores information. For example, the information may include fraudulent transaction data 122 used to calculate transaction quality scores for a plurality of different merchants 110, 112 and 114. In one embodiment, the merchants 110 and 112 may be brick and mortar stores and the merchant 114 may be an online merchant. It should be noted that although only three merchants are illustrated in FIG. 1, any number of merchants (more or less) may be deployed.

In one embodiment, the AS 104 and the DB 106 may be operated by a third entity 150, such as for example, a fraud detection service provider or a transaction management service provider. For example, each transaction by a consumer 120 with one of the merchants 110, 112 and 114 may be tracked by the AS 104 and stored in the DB 106 over a period of time (e.g., for the entire history of a merchant 110, 112 or 114, over a rolling time period, and the like).

For example, the consumer 120 may purchase an item from the online merchant 114 over the Internet via the IP network 102. The consumer 120 may pay for the item with a credit card issued by the bank of the consumer 120 that uses a payment processing entity 108 (e.g., MasterCard®, Visa®, American Express®, Discover®, PayPal®, and the like). The payment processing entity 108 may then send the transaction details to the third party entity 150 for general transaction management or fraud analysis. In one embodiment, the payment processing entity 108 and the third party entity 150 may be the same or combined as a single entity operating the AS 104 and DB 106.

If the consumer 120 complains to the payment processing entity 108 of a fraudulent transaction, the details of the fraud claim may be sent to the third party entity 150 for analysis. Based on the outcome of the fraud claim, the transaction may be marked as a fraudulent transaction. Fraudulent activity may be similarly tracked for each one of the merchants 110, 112 and 114.

In one embodiment, an anomalous spending pattern algorithm server 140 may be in communication with the payment processing entity 108 and the third party entity 150. The anomalous spending pattern algorithm may automatically analyze transactions and identify anomalous transactions that could be potentially fraudulent. The details of the potentially fraudulent transactions may be sent to the third party entity 150 for analysis.

In one embodiment, a fraudulent transaction may be defined as a transaction that resulted in a failure to deliver a product or a service that has been paid for (e.g., the consumer 120 buys an item and the item is never received or receives a wrong item that cannot be returned), a sale of a counterfeit product (e.g., the consumer 120 walks into a street vendor in New York City and buys a fake Prada® bag), a difference in an amount deducted from a payment method compared to an amount charged (e.g., the consumer 120 believes he is being charged $39.99 and the merchant deducts $139.99 from the payment method) or a fulfillment of an order with a stolen payment method (e.g., the merchant allows $1,000 worth of merchandise to be bought with a stolen credit card). It should be noted that fraudulent transactions do not include transactions where items are returned and the consumer 120 is refunded for the purchase amount.

In one embodiment, the fulfillment of an order with a stolen payment method may be the most difficult to identify between the consumer 120 and the merchants 110 and 112. For example, neither the consumer 120 nor the merchants 110 and 112 may be able to easily detect that the transaction was a fraudulent transaction as the payment is cleared, the correct amount is charged, the item is shipped and received correctly, and so forth. Embodiments of the present disclosure may be most helpful for detecting fraudulent transactions for the fulfillment of an order with a stolen payment method.

As noted above, all the transactions may be stored in the DB 106. When a transaction is identified as fraudulent either from an investigation of an inquiry from a cardholder, or identified from an anomalous spending pattern, the fraudulent activity field associated with this transaction is then set to true. From the complete list of transactions associated with each merchant, a new table of merchant fraudulent transaction data can be created that identifies the number of fraudulent transactions and valid transactions for each merchant. In one embodiment, the fraudulent transaction data table 122 may include a name of the merchant 124, a merchant category code (MCC code) 126, a total number of transactions (TRX) 128, a total number of fraudulent transactions (FRAUD TRX) 130, and a percentage of fraudulent transactions 134. It should be noted that data columns of the fraudulent transaction data table 122 are only listed as a broad example. Additional columns that include more granular detail may be included, such as for example, a number of mail order/telephone order (MOTO) transactions, a number of online transactions, the merchant's identity code, a mean age of the fraudulent transaction, and the like.

As noted above, the fraudulent transaction data table 122 may be kept continuously for the entire life of each one of the merchants 110, 112 and 114. In another embodiment, the fraudulent transaction data table 122 may be kept for each one of the merchants 110, 112 and 114 continuously over a rolling time period. For example, the rolling time period may be a rolling 90 day time period.

In one embodiment, the fraudulent transaction data table 122 may be used to calculate a transaction quality score. In one embodiment, the transaction quality score may simply be the percentage of fraudulent transactions 134 stored in the fraudulent transaction data table 122. In another embodiment, the transaction quality score may be converted into a numerical value (e.g., between 0-100), a letter grade (e.g., between A+++ and F), or a star rating (e.g., between 0-5 stars) that may be more meaningful for the consumer 120.

In one embodiment, the transaction quality score may be calculated for only those merchants that have enough transactions or based on a predefined time period. For example, to prevent from issuing a misleading transaction quality score of a perfect 100 for a merchant that has had a few transactions (e.g., due to being a newly opened merchant) a threshold value may be used (e.g., at least 500 transactions). Thus, in the fraudulent transaction data table 122, only merchants ABC, GHI, MNO and PQR would have transaction quality scores calculated.

In one embodiment, the transaction quality score may be calculated for a predefined time period. For example, the predefined time period may be the entire history of transactions or all of the fraudulent transaction data that is available. In another embodiment, the transaction quality score may be calculated for the fraudulent transaction data table 122 within a rolling time period (e.g., a rolling 90 day time period). In one embodiment, using the rolling time period may allow merchants to have a chance to improve the transaction quality score as past fraudulent transactions are removed from the score if no new fraudulent transactions appear in their transaction history.

In one embodiment, both the threshold for a number of transactions and the predefined time period may be used. For example, the transaction quality score may be calculated for only those merchants having greater than 1000 transactions in the last 30 days.

In one embodiment, the transaction quality score may be calculated into a numerical value, a letter grade, or a star rating by grouping each merchant into a bin having a percentage of fraudulent transactions. For example, a first bin may be a score of 100, a letter grade of A+, or 5 stars for those merchants having a fraudulent transaction percentage less than 0.1%, a next bin may have a score of 90, a letter grade of A, or 4 stars for having a fraudulent transaction percentage between 0.1%-5%, and so forth.

In another embodiment, the transaction quality score may be calculated as a numerical value based on a relative comparison of the merchants and a difference in fraudulent transaction percentage from the merchants having a 0% fraudulent transaction percentage. For example, a merchant may have a transaction quality score of 100 for a 0% fraudulent transaction percentage. The next merchant may have a 1% high fraudulent transaction percentage and thus have a transaction quality score of 99, and so forth.

In one embodiment, the transaction quality score may be calculated for each merchant within a particular category. For example, in the fraudulent transaction data table 122, the merchants DEF, GI-II and PQR may each be within the MCC of 5964 (i.e., a catalog merchant). In other words, the transaction quality score may be calculated for each merchant within the merchant's respective category. Thus, when calculating the transaction quality score based on a comparison to other merchants, the comparison may be based on the other merchants within the same category (i.e., having the same MCC code) and not with all merchants. For example, for catalog merchants the merchant with the lowest amount of fraud may still have a rate of 0.2% fraudulent transactions. That merchant would receive a transaction quality score of 100. Other merchants with a higher rate of fraudulent transactions would have a lower transactions quality score.

In one embodiment, the transaction quality score may then be transmitted via an application running on an endpoint device 116 of the consumer 120 for display to the consumer 120. In one embodiment, the endpoint device 116 may be any device capable of running the application and being communicatively coupled, via either a wired or wireless connection, to the IP network 102. For example, the endpoint device 116 may be a laptop computer, a desktop computer, a smart phone, a tablet computer, a netbook computer, and the like.

The consumer 120 may then review the transaction quality scores for the merchants 110, 112 and 114 before proceeding with a transaction. In one embodiment, the application may automatically filter the merchants based on a threshold. For example, the application may only display merchants with a transaction quality score above 90, a letter grade A, or 4 stars.

In one embodiment, the filter criteria may be user defined or set by the consumer 120. For example, the consumer 120 may want to try to find a better price by including higher risk merchants and set the threshold to 50 or higher. However, in one embodiment, the application may be issued by the payment processing entity 108 and require the consumer 120 to use the application for telephone order or online order transactions. The application may be in communication with the payment processing entity 108 and/or the third party entity 150. In doing so, the payment processing entity 108 may reduce the risk and costs associated with potentially fraudulent transactions by offloading the risk and liability to the consumer 120 if the consumer 120 decides to use a high risk merchant.

For example, the payment processing entity 108 may set a high risk threshold to 90. As noted above, the consumer 120 may wish to look for the best deal and include merchants that have a transaction quality score of 50 or above. The consumer 120 may decide to purchase an item from a merchant with a transaction quality score of 59.

When the consumer 120 selects the merchant in the application, the application may display a warning to the consumer 120 that the consumer 120 will be liable for any fraud associated with a transaction with merchant having the quality transaction score below the high risk threshold of 90. The application may wait to receive confirmation from the consumer 120 before allowing the consumer 120 to proceed with the transaction with the merchant. The confirmation may be received by the payment processing entity 108 or the third party entity 150, thereby, absolving the payment processing entity 108 of any liability by agreement with the consumer 120 of any costs associated with a potential fraudulent transaction.

In one embodiment, the payment processing entity 108 may control the transactions of the consumer 120 by only authorizing payment with the payment method associated with the payment processing entity 108 that are initiated via the application. For example, if the consumer 120 attempts to directly visit the website of a merchant having a transaction quality score below the high risk threshold without the application to avoid the shift in liability for a potentially fraudulent transaction, the payment processing entity 108 may detect that the transaction was not initiated via the application and deny the transaction. A record of the denied transaction due to the consumer 120 attempting to avert the application to proceed with a transaction with a high risk merchant may be sent to the third party entity 150. Thus, the payment processing entity 108 may direct the consumer 120 to more trusted merchants with higher transaction quality scores, thereby, reducing costs associated with fraudulent transactions of less reputable merchants.

In one embodiment, the consumer 120 may apply additional filter criteria. For example, the consumer 120 may filter the transaction quality score of merchants based on a specific category. For example, the consumer 120 may look for online merchants with the highest transaction quality score or a telecommunication service with the highest transaction quality score, and the like. The transaction quality scores displayed to the consumer 120 may be displayed from highest to lowest for only those merchants within the desired category.

In one embodiment, the consumer 120 may apply a filter based on a location of the consumer 120. In one embodiment, the endpoint device 116 may be a mobile endpoint device (e.g., a smart phone) having a global positioning system (GPS) radio 118. Thus, the application may determine the location of the consumer 120 and the consumer may filter merchants within a predefined radius (e.g., within 100 feet, within 5 miles, and the like) of the location of the consumer 120.

For example, the consumer 120 may be looking to purchase a handbag while walking around in New York City. However, the consumer 120 may not be sure which merchants are selling authentic brand hand bags and which merchants are selling a counterfeit bag. The consumer may use the application on the endpoint device 116 to filter for merchants in a handbag category within 1000 yards of the location of the consumer 120. The merchants with the highest transaction quality scores may be displayed to the consumer 120 with the address or location of each merchant.

The consumer 120 may then shop confidently knowing that he or she is likely not engaging in a fraudulent transaction.

Figure 2:
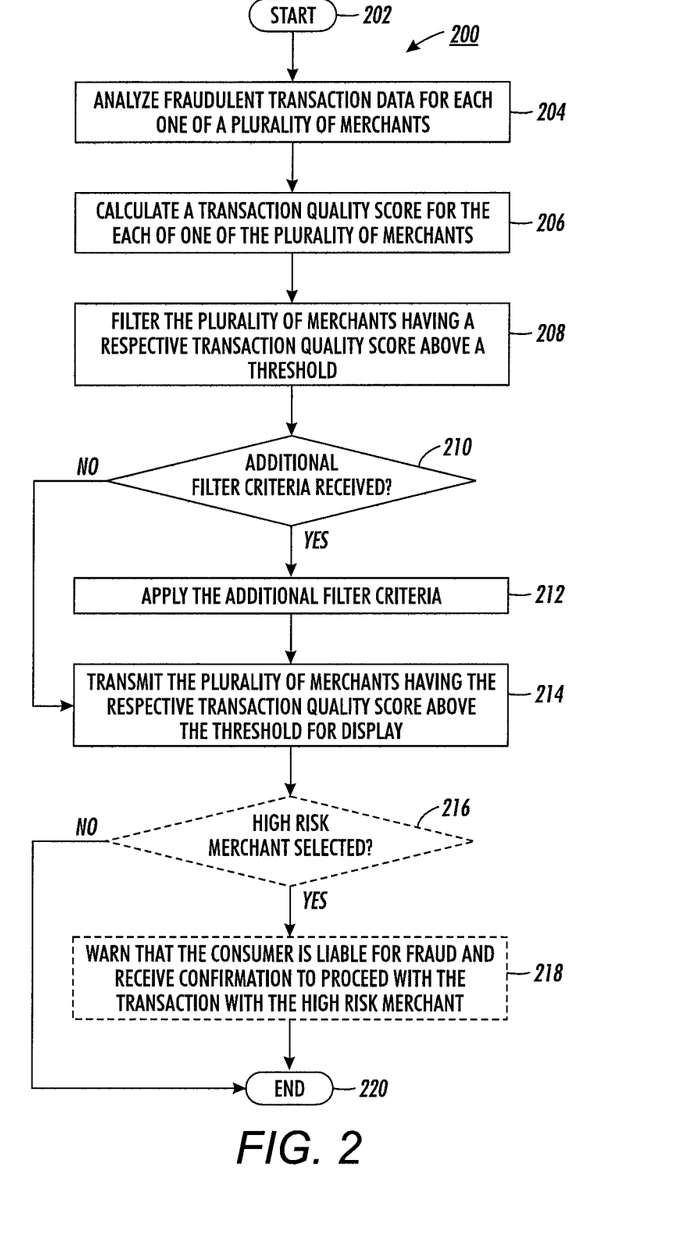
FIG. 2 illustrates an example flowchart of one embodiment of a method for calculating a transaction quality score of a merchant.

FIG. 2 illustrates a flowchart of a method 200 for calculating a transaction quality score of a merchant. In one embodiment, one or more steps or operations of the method 200 may be performed by the AS 104 or a general-purpose computer as illustrated in FIG. 3 and discussed below.

At step 202 the method 200 begins. At step 204, the method 200 analyzes fraudulent transaction data table for each one of a plurality of merchants. As discussed above, in one embodiment, the fraudulent transaction data table may be first created from transactions that are identified as being fraudulent. The fraudulent transaction data table may include information such as for example, name of the merchant, the merchant code, a total number of transactions, a total number of fraudulent transactions, a fraudulent transaction percentage, and the like.

In one embodiment, the fraudulent transaction data table may also be updated before the analysis is performed. For example, fraudulent transaction data may be collected over a predefined period of time (e.g., over an entire history of a merchant or a continuous rolling time period). If the fraudulent transaction data is collected over an entire history, new transactions are added to the fraudulent transaction data table. If there is a continuous rolling time period, new transactions are added to the fraudulent transaction data table and older transactions are removed. The fraudulent transaction data may then be analyzed to determine which merchants may or may not have a transaction quality score calculated based on a threshold of a minimum number of transactions, a predefined time period or a combination of both. For example, the analysis may include a filtering function to identify which merchants will be assigned a transaction quality score.

At step 206, the method 200 calculates a transaction quality score for the each one of the plurality of merchants. For example, the transaction quality score may be based on the fraudulent transaction data table that was created. In one embodiment, the transaction quality score may simply be the percentage of fraudulent transactions 134 stored in the fraudulent transaction data table 122. In another embodiment, the transaction quality score may be converted into a numerical value (e.g., between 0-100), a letter grade (e.g., between A+++ and F), or a star rating (e.g., between 0-5 stars) that may be more meaningful for the consumer 120.

In one embodiment, the transaction quality score may be calculated into a numerical value, a letter grade, or a star rating by grouping each merchant into a bin having a percentage of fraudulent transactions. For example, a first bin may be a score of 100, a letter grade of A+, or 5 stars for those merchants having a fraudulent transaction percentage less than 0.1%, a next bin may have a score of 90, a letter grade of A, or 4 stars for having a fraudulent transaction percentage between 0.1%-5%, and so forth.

In another embodiment, the transaction quality score may be calculated as a numerical value based on a relative comparison of the merchants and a difference in fraudulent transaction percentage from the merchants having a 0% fraudulent transaction percentage. For example, a merchant may have a transaction quality score of 100 for a 0% fraudulent transaction percentage. The next merchant may have a 1% high fraudulent transaction percentage and thus have a transaction quality score of 99, and so forth.

At step 208, the method 200 filters the plurality of merchants having a respective transaction quality score above a threshold. In one embodiment, the application may automatically filter the merchants based on a threshold. For example, the application may only display merchants with a transaction quality score above 90, a letter grade of A, or 4 stars. In another embodiment, the threshold may be user defined.

At step 210, the method 200 determines if additional filter criteria are received. For example, a user may want to filter the plurality of merchants by a merchant category, by range within a predefined radius of the user's location, and the like. If no additional filter criteria are received, the method 200 may proceed to step 214.

If additional filter criteria are received, the method 200 may proceed to step 212. At step 212, the method 200 may apply the additional filter criteria.

At step 214, the method transmits the plurality of merchants having the respective transaction quality score above the threshold for display. For example, the transaction quality scores may be displayed on an endpoint of a consumer via an application.

At optional step 216, the method 200 may determine if a high risk merchant was selected. For example, the consumer may want to try to find a better price by including higher risk merchants and set the threshold to 50 or higher. However, the payment processing entity may set a high risk threshold to 90. The consumer may decide to purchase an item from a merchant with a transaction quality score of 59, which is below the high risk threshold.

If a high risk merchant was not selected, the method 200 may proceed to step 220. If a high risk merchant was selected, the method 200 may proceed to optional step 218.

At optional step 218, the method 200 may warn that the consumer is liable for fraud and wait to receive confirmation to proceed with the transaction with the high risk merchant. For example, when the consumer selects the merchant with a transaction quality score below the high risk threshold in the application, the application may display a warning to the consumer that the consumer will be liable for any fraud associated with a transaction with merchant. The application may wait to receive confirmation from the consumer before allowing the consumer to proceed with the transaction with the merchant. The confirmation may be received by the payment processing entity or the third party entity, thereby, absolving the processing entity of any liability by agreement with the consumer any costs associated with a potential fraudulent transaction. At step 212, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for calculating a transaction quality score of a merchant, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for calculating a transaction quality score of a merchant (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for calculating a transaction quality score of a merchant (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for calculating a transaction quality score of a merchant, comprising:
   analyzing, by a processor of a server of a payment processing entity, fraudulent transaction data in a fraudulent transaction data table for each one of a plurality of merchants;
   calculating, by the processor, the transaction quality score for the each one of the plurality of merchants based on the fraudulent transaction data;
   filtering, by the processor, the plurality of merchants having a respective transaction quality score above a threshold and the plurality of merchants that are within a predefined radius of a location of the endpoint device, wherein the location of the endpoint device is determined based on a global positioning system (GPS) radio of the endpoint device;
   transmitting, by the processor, the plurality of merchants having the respective transaction quality score above the threshold to an endpoint device of a consumer for display via an application executed on the endpoint device, wherein the application is issued by the payment processing entity and the consumer is required to use the application executed on the endpoint device for an online order;
   establishing, by the processor, a communication path between the application executed on the endpoint device and the server of the payment processing entity in response to the application being executed by the endpoint device; and
   controlling, by the processor, a transaction initiated by the endpoint device based on communication with the application executed on the endpoint device over the communication path, wherein the controlling comprises:
      detecting, by the processor, when the transaction is not initiated on the application executed on the endpoint device over the communication path;
      denying, by the processor, the transaction that is detected not to be initiated on the application executed by the endpoint device and when a payment method associated with the payment processing entity is used for the transaction with a merchant that is not one of the plurality of merchants having the respective transaction quality score above the threshold that is displayed via the application; and
      directing the consumer to one of the plurality of merchants having the respective transaction quality score above the threshold.

2. The method of claim 1, wherein the fraudulent transaction data comprises a percentage of transactions that resulted in at least one of: a failure to deliver a product or a service that has been paid for, a sale of a counterfeit product, a difference in an amount deducted from a payment method compared to an amount charged or a fulfillment of an order with a stolen payment method.

3. The method of claim 1, wherein the analyzing is based on all of the fraudulent transaction data that is available.

4. The method of claim 1, wherein the analyzing is based on the fraudulent transaction data within a rolling time period.

5. The method of claim 1, wherein the analyzing only includes the plurality of merchants having a number of transactions above a threshold of a number of transactions.

6. The method of claim 1, wherein the calculating comprises:
   distributing, by the processor, a respective fraudulent transaction percentage for each one of the plurality of merchants obtained from the fraudulent transaction data into one of a plurality of bins, wherein each one of the plurality of bins is assigned a percentage range; and
   assigning, by the processor, a different transaction quality score to each one of the plurality of bins.

7. The method of claim 1, wherein the transaction quality score comprises at least one of: a numerical value, a letter grade, or a star rating.

8. The method of claim 1, wherein the filtering further comprises:
   grouping, by the processor, each one of the plurality of merchants into a plurality of different categories; and
   receiving, by the processor, a selection of one of the plurality of different categories, wherein only a subset of the plurality of merchants within the one of the plurality of different categories that is selected is displayed.

9. The method of claim 1, wherein the filtering further comprises removing one or more of the plurality of merchants having the respective transaction quality score above the threshold that are outside of a predefined range of a location of a consumer.

10. The method of claim 1, wherein the controlling further comprises:
    receiving, by the processor, a request from the endpoint device to authorize the transaction with a merchant that is not one of the plurality merchants having the respective transaction quality score above the threshold;
    warning, by the processor, a consumer that the consumer is liable for any fraud associated with the transaction with the merchant that is not one of the plurality merchants having the respective transaction quality score above the threshold;
    receiving, by the processor, a confirmation to proceed with the transaction with the merchant that is not one of the plurality merchants having the respective transaction quality score above the threshold; and
    authorizing, by the processor, the transaction in response to the confirmation being received.

11. A non-transitory computer-readable medium storing a plurality of instructions which, when executed by a processor of a server of a payment processing entity, cause the processor to perform operations for calculating a transaction quality score of a merchant, the operations comprising:
    analyzing fraudulent transaction data in a fraudulent transaction data table for each one of a plurality of merchants;
    calculating the transaction quality score for the each one of the plurality of merchants based on the fraudulent transaction data;
    filtering the plurality of merchants having a respective transaction quality score above a threshold and the plurality of merchants that are within a predefined radius of a location of the endpoint device, wherein the location of the endpoint device is determined based on a global positioning system (GPS) radio of the endpoint device;
    transmitting the plurality of merchants having the respective transaction quality score above the threshold to an endpoint device of a consumer for display via an application executed on the endpoint device, wherein the application is issued by the payment processing entity and the consumer is required to use the application executed on the endpoint device for an online order;
    establishing, by the processor, a communication path between the application executed on the endpoint device and the server of the payment processing entity in response to the application being executed by the endpoint device; and
    controlling a transaction initiated by the endpoint device based on communication with the application executed on the endpoint device over the communication path, wherein the controlling comprises:
      detecting, by the processor, when the transaction is not initiated on the application executed on the endpoint device over the communication path;
      denying, by the processor, the transaction that is detected not to be initiated on the application executed by the endpoint device and when a payment method associated with the payment processing entity is used for the transaction with a merchant that is not one of the plurality of merchants having the respective transaction quality score above the threshold that is displayed via the application; and
      directing the consumer to one of the plurality of merchants having the respective transaction quality score above the threshold.

12. The non-transitory computer-readable medium of claim 11, wherein the fraudulent transaction data comprises a percentage of transactions that resulted in at least one of: a failure to deliver a product or a service that has been paid for, a sale of a counterfeit product, a difference in an amount deducted from a payment method compared to an amount charged or a fulfillment of an order with a stolen payment method.

13. The non-transitory computer-readable medium of claim 11, wherein the analyzing is based on all of the fraudulent transaction data that is available.

14. The non-transitory computer-readable medium of claim 11, wherein the analyzing is based on the fraudulent transaction data within a rolling time period.

15. The non-transitory computer-readable medium of claim 11, wherein the calculating comprises:
    distributing, by the processor, a respective fraudulent transaction percentage for each one of the plurality of merchants obtained from the fraudulent transaction data into one of a plurality of bins, wherein each one of the plurality of bins is assigned a percentage range; and
    assigning, by the processor, a different transaction quality score to each one of the plurality of bins.

16. The non-transitory computer-readable medium of claim 11, wherein the filtering further comprises:
    grouping, by the processor, each one of the plurality of merchants into a plurality of different categories; and
    receiving, by the processor, a selection of one of the plurality of different categories, wherein only a subset of the plurality of merchants within the one of the plurality of different categories that is selected is displayed.

17. The non-transitory computer-readable medium of claim 11, wherein the filtering further comprises removing one or more of the plurality of merchants having the respective transaction quality score above the threshold that are outside of a predefined range of a location of a consumer.

18. The non-transitory computer-readable medium of claim 11, wherein the controlling further comprises:
    receiving a request from the endpoint device to authorize the transaction with a merchant that is not one of the plurality merchants having the respective transaction quality score above the threshold;

warning a consumer that the consumer is liable for any fraud associated with the transaction with the merchant that is not one of the plurality merchants having the respective transaction quality score above the threshold;

receiving a confirmation to proceed with the transaction with the merchant that is not one of the plurality merchants having the respective transaction quality score above the threshold; and authorizing the transaction in response to the confirmation being received.

19. A method for calculating a transaction quality score of a merchant, comprising:

collecting, by a processor of a server of a payment processing entity, fraudulent transaction data for each one of a plurality of merchants, wherein the fraudulent transaction data comprises a percentage of transactions that resulted in at least one of: a failure to deliver a product or a service that has been paid for, a sale of a counterfeit product, a difference in an amount deducted from a payment method compared to an amount charged or a fulfillment of an order with a stolen payment method;

creating, by a processor, a fraudulent transaction data table based on the fraudulent transaction data;

analyzing, by a processor, the fraudulent transaction data in the fraudulent transaction data table for the each one of a plurality of merchants;

calculating, by the processor, the transaction quality score for the each one of the plurality of merchants based on the fraudulent transaction data, wherein the transaction quality score is based on a comparison of the fraudulent transaction data for one of the plurality of merchants and other ones of the plurality of merchants;

filtering, by the processor, the plurality of merchants having a respective transaction quality score above a threshold and the plurality of merchants that are within a predefined radius of a location of the endpoint device, wherein the location of the endpoint device is determined based on a global positioning system (GPS) radio of the endpoint device;

transmitting, by the processor, the plurality of merchants having the respective transaction quality score above the threshold to an endpoint device of a consumer for display via an application executed on an endpoint device, wherein the application is issued by the payment processing entity and the consumer is required to use the application executed on the endpoint device for an online order;

establishing, by the processor, a communication path between the application executed on the endpoint device and the server of the payment processing entity in response to the application being executed by the endpoint device; and controlling, by the processor, a transaction initiated by the endpoint device based on communication with the application executed on the endpoint device over the communication path, wherein the controlling comprises:

detecting, by the processor, when the transaction is not initiated on the application executed on the endpoint device over the communication path;

denying, by the processor, the transaction that is detected not to be initiated on the application executed by the endpoint device and when a payment method associated with the payment processing entity is used for the transaction with a merchant that is not one of the plurality of merchants having the respective transaction quality score above the threshold that is displayed via the application; and directing the consumer to one of the plurality of merchants having the respective transaction quality score above the threshold.

* * * * *